March 24, 1925.  1,531,093
F. L. HEATHMAN
REGISTERING APPARATUS FOR LIQUID DISPENSING PUMPS
Filed March 24, 1924    2 Sheets-Sheet 1
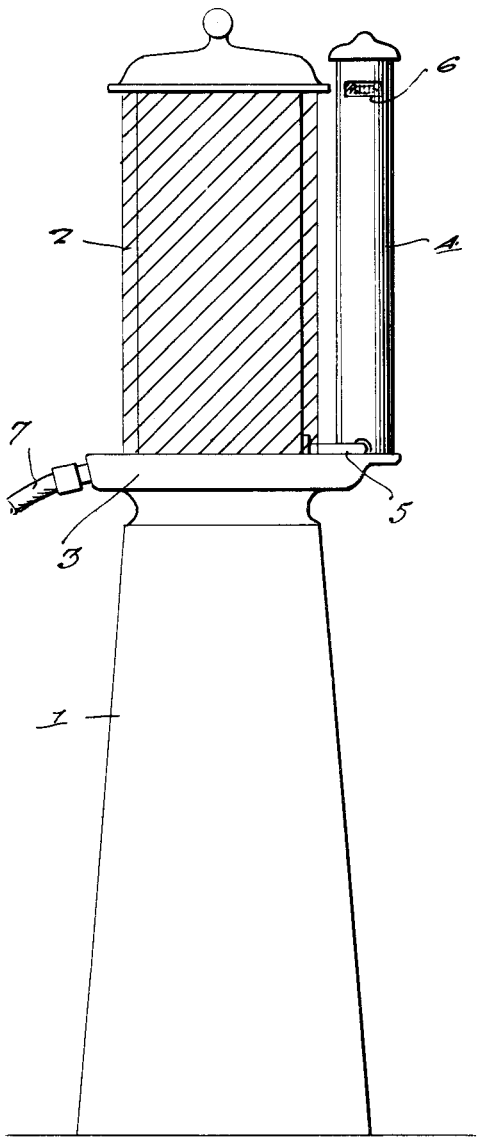
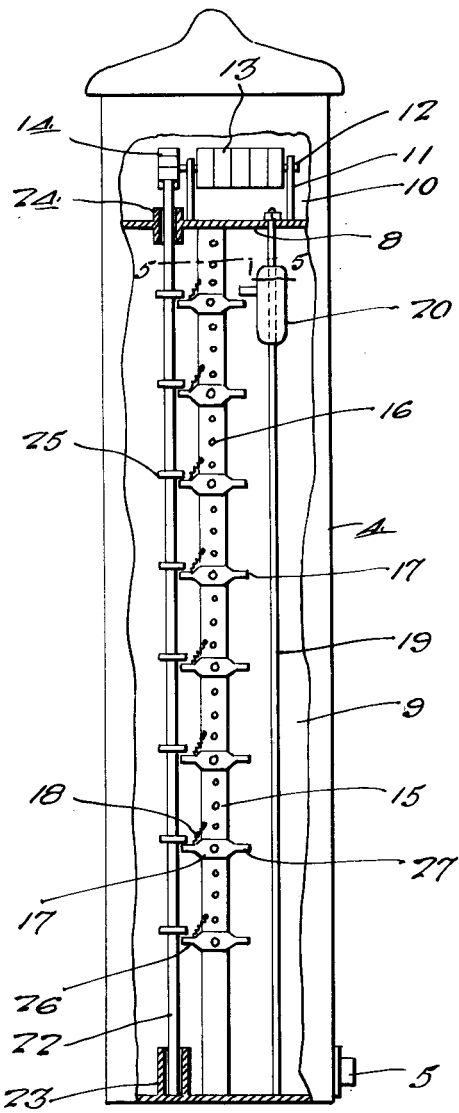
Inventor
F. L. Heathman
By Clarence A. O'Brien
Attorney

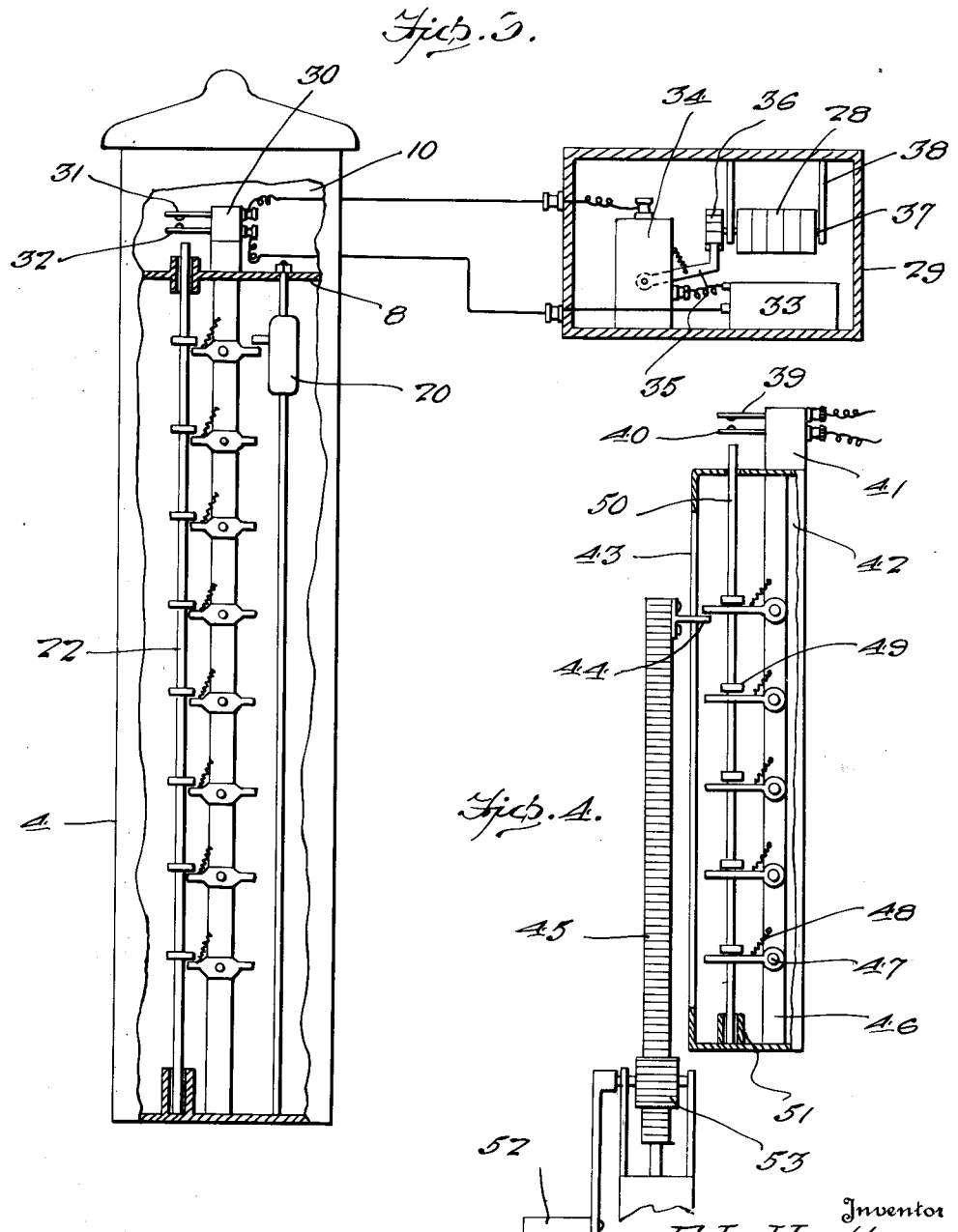

Patented Mar. 24, 1925.

1,531,093

UNITED STATES PATENT OFFICE.

FREDERICK L. HEATHMAN, OF LA HARPE, KANSAS.

REGISTERING APPARATUS FOR LIQUID-DISPENSING PUMPS.

Application filed March 24, 1924. Serial No. 701,550.

*To all whom it may concern:*

Be it known that I, FREDERICK L. HEATHMAN, a citizen of the United States, residing at La Harpe, in the county of Allen and State of Kansas, have invented certain new and useful Improvements in a Registering Apparatus for Liquid-Dispensing Pumps, of which the following is a specification.

This invention relates to new and useful improvements in registers for liquid vending machines and is particularly adapted for use in connection with gasoline vending machines or pumps and has for its principal object to provide a means for recording of the measured quantities of gasoline dispensed from the pump.

A further object of the invention is to provide a device of the above mentioned character, which is particularly adapted to be associated with a gasoline dispensing pump of the visible type wherein a vertical movable float is utilized within a chamber in circulating communication with the main measuring vessel for the purpose of actuating the registering means so as to permit the operator of the pump to readily ascertain the exact amount of gasoline which is dispensed from the pump.

A still further object of the invention is to provide a device of the above mentioned character, wherein means is provided for automatically actuating a registering meter simultaneously with the dispensing of gasoline and the like from the pump so as to efficiently indicate the amount of gasoline which is dispensed. A still further object of the invention is to provide a device of the above mentioned character, which is simple in construction, inexpensive, strong and durable and furthermore adapted for the purposes for which it is designed.

A further object of the invention is to provide a device of the above mentioned character which will not in any way interfere with the filling of the main measuring vessel or in the dispensing of a liquid therefrom.

Other objects and advantages of this invention will become apparent during the course of the following description.

In the accompanying drawings forming a part of the specification, and in which like numerals designate like parts throughout the same, Figure 1 is a side elevation of a gasoline dispensing pump of the visible type showing my invention in position thereon, Figure 2 is an enlarged side elevation of the actuating means for the register showing the same mounted in the chamber, Figure 3 is a similar view showing the application of my registering device in connection with electrically controlled means for actuating the meter, Figure 4 is a further modification showing the push rod and actuating means therefor in connection with a hand pump, and Figure 5 is a sectional view taken approximately on line 5—5 of Figure 2.

In the drawings wherein for the purpose of illustration is shown the preferred embodiment of my invention, the numeral 1 designates generally a gasoline dispensing pump of the well known construction which is provided with the visible main measuring vessel 2. A support therefor is indicated by the numeral 3 and it is to be understood of course that the gasoline is delivered to the main measuring vessel 2 in the well known manner and it is not thought necessary to further go into detail relative to the same as it forms no important part of the present invention. Mounted on the support 3 adjacent the main measuring vessel 2 is the cylindrical chamber 4 which is in circulating communication with the bottom of the main measuring vessel 2 through the medium of the pipe 5. The chamber 4 may be formed of any suitable material and I do not wish to limit myself to the particular kind of material to be used. The upper portion of the chamber is provided with an opening 6 through which the meter may be readily viewed in the manner as will be presently described. The outlet pipe for dispensing the gasoline from the main measuring vessel 2 is shown at 7 and is of the usual construction and is further operated in the well known manner.

Extending transversely within the chamber 4 adjacent the upper end thereof is the plate or partition 8. This plate 8 forms an enlarged compartment 9 and a smaller compartment 10 in the manner clearly shown in Figure 2 of the drawings. Supported in the compartment 10 by means of the upstanding brackets 11 is the shaft 12 upon which are mounted the cylindrical members 13 and upon which are inscribed in any well known manner the numbers corresponding with the amount of gasoline adapted to be contained within the main measuring vessel 2. This construction provides what is termed a registering meter and as the same is well known in the art it is not thought necessary to go into detail relative to the same. It is also understood that the shaft 12 has a ratchet wheel 14 mounted on the outer end thereof whereby the shaft and the cylinders 13 may be rotated successively depending on the rotation of the ratchet wheel 14. The cylinders are further so arranged as to be disposed adjacent the openings 6 in the top of the chamber so that the same may be readily visible.

Supported in the compartment 9 and extending vertically therein is the trigger arm 15. The trigger arm is provided with a plurality of spaced apertures such as shown at 16 and adapted to be movably supported on the trigger arm 15 in certain of the apertures 16 thereof are the triggers 17. The triggers 17 have their outer ends extending beyond the sides of the trigger arm 15 in the manner clearly shown in Figure 2 of the drawings and for the purpose of normally holding the trigger arms in a horizontal inoperative position I provide the coil springs 18 in the manner as illustrated. Any number of triggers may be mounted the trigger arms depending on the size of the measuring vessel 2 and I have arranged the triggers on the trigger arms 15 in such a manner as to be spaced at predetermined intervals to represent one-half gallon between each trigger. The trigger arm 15 is preferably arranged in the central portion of the chamber and adapted to be supported within the main compartment 9 on one side of the trigger arm 15 is the rod 19.

The upper end of the rod 19 is secured to the plate 8 in the manner shown in Figure 2 of the drawings. The lower end of the rod is secured to the bottom of the chamber 4 in any suitable manner. Adapted for vertical sliding movement on the rod 19 is the float 20. This float may also be formed of any suitable material and I do not wish to limit myself to the particular kind of material to be used. The float 20 has extending outwardly from the side thereof the finger 21 which is adapted to cooperate with one of the ends of each of the triggers in the manner to be hereinafter more fully described. The float 20 moves vertically on the rod 19 in either direction depending upon the amount of gasoline within the chamber 4, it being understood of course that when the chamber 4 is filled as will also be the main measuring vessel the float 20 will be at the top of the main compartment 9 and as the gasoline is dispensed from the main measuring vessel the gasoline in the chamber 4 will also be consumed and thus the float will descend therewith.

Mounted on the opposite side of the trigger arm 15 and arranged vertically in the chamber 4 is the push rod 22. The lower end of the push rod is supported in a suitable socket 23 provided on the bottom of the chamber 4 while the other end of the push rod extends through a sleeve 24 provided in the plate 8 and extends into the compartment 10 for engagement with the ratchet wheel 14. Carried by the push rod 22 are the collars 25 the same being arranged at predetermined positions on the push rod and approximately above the opposite ends of the triggers 17 in the manner clearly shown in Figure 2 of the drawings. Normally the ends 26 of the triggers 17 are disposed below the collars 25 on the push rod 22 and the upper end of the push rod is out of engagement with the ratchet wheel 14.

The operation of the registering device above described may be briefly stated as follows: When the main measuring vessel 2 is filled with gasoline the chamber 4 will also be simultaneously filled through the medium of the connection 5 and the float 20 will rise upwardly on the rod, the fingers 21 striking the ends 27 of the triggers and causing the same to swing upwardly simultaneously causing the downward swinging of the opposite ends 26 of the trigger. When the main measuring vessel has been filled as has also the chamber 4, the float 20 will be in the position shown in Figure 2 of the drawings. Upon dispensing the gasoline from the main measuring vessel 2 through the pipe 7 in the usual manner, the gasoline in the chamber 4 will also be consumed and the float 20 will descend therewith simultaneously having the finger 21 thereof engaging the ends 27 of the trigger moving the same downwardly and simultaneously swinging the opposite end 26 of the triggers into engagement with the collars 25 thereby causing the push rod 22 to be raised upwardly through the sleeve 24 so that the upper end thereof will turn the ratchet wheel 14 and simultaneously operate the cylinders 13 to indicate the amount of gasoline dispensed.

It is to be understood that the triggers and collars on the push rod are actuated successively so that when the uppermost trigger is actuated to operate the uppermost collar on the push rod the register will indicate that a half-gallon of gasoline has been dispensed. The next adjacent trigger and collar when operated will cause the register or meter to indicate the dispensing of a gallon of gasoline and the succeeding trigger and cooperating collar will successively increase in value so as to permit a person operating the pump to readily ascertain the exact amount of gasoline which has been dispensed from the main measuring vessel 2. The purpose of this arrangement is to overcome the loss of gasoline which is experienced with the visible measuring tanks now in use and the provision of such a measuring device will accurately register the exact amount of gasoline which is dispensed from the main measuring vessel.

In Figure 3 of the drawings a modification is shown wherein the meter 28 is supported in a suitable housing 29 which is located at a point a distance from the dispensing pump upon which the chamber 4 is supported and may be located in any suitable place whereby a person may readily view the meter 28 to determine the amount of gasoline dispensed from the gasoline pump. With the construction shown in the modification in Figure 3 the meter 28 is actuated by the electrical apparatus to be presently described.

Supported in the upper compartment 10 of the chamber 4 is an insulated block 30 and from which extends the spaced contacts 31 and 32 which are normally held in spaced relation with respect to each other. The contacts 31 and 32 are connected to a source of electric supply such as is shown at 33 and to a magnet 34 in the manner shown in Figure 3 and a suitable pawl 35 is associated with the magnet for actuating the ratchet wheel 36 mounted on the shaft 37 which supports the indicating cylinder 28. The shaft 37 is supported in the housing 29 by means of the bracket 38. The contacts are adapted to be brought into engagement with each other upon the upward movement of the push rod 22 in the manner heretofore described and as the push rod is raised upwardly through the plate 8 the same will force the contacts together completing the circuit wherein the magnets 34 will be energized and will automatically cause the arm 35 to actuate the ratchet 36 for turning the cylinder in the same manner as heretofore more fully described. The action of the contacts 31 and 32 will be periodically depending upon the descending of the float 20 in connection with the gasoline which is dispensed from the main measuring vessel and the chamber 4.

In Figure 4 a still further modification is shown wherein the meter or registering device is substantially the same as that shown in Figure 3, the same being adapted to be actuated by the contacts 39 and 40 which are supported on the slots 41. The meter in this instance however is adapted to be associated with a hand pump wherein the casing 42 is supported in any suitable manner upon the pump and has the longitudinally extending slot 43 provided in the side wall thereof whereby the trigger actuating member 44 carried by the upper end of the plunger 45 will operate therein. Supported in the casing 42 is the trigger arm 46 and the same has pivotally secured thereto at predetermined intervals the triggers 47. Suitable coil springs 48 are provided for normally holding the triggers in their inoperative positions and the same are adapted to cooperate with the collars 49 mounted at predetermined intervals on the push rod 50. The upper end of the push rod 50 extends through a suitable opening provided in the top of the casing while the lower end is supported in the socket 51 provided in the bottom of the casing 42.

In operation, when the handle of the pump such as is shown at 52 is rotated so that the pinion 53 will operate the rack portion of the plunger 45 in dispensing the gasoline, the plunger 44 will move upward and have the finger 44 carried thereby engage the outer ends of the triggers 47 so as to cause the same to engage the collars 49 on the push rod 50 moving the same upwardly to cause the contacts 39 and 40 to periodically be in engagement with each other whereby the circuit is completed in the manner heretofore described and for the purpose of actuating the meter electrically connected to the contacts.

It is also to be understood that my registering device may be used in oil fields and at oil line stations, on pipe lines, where it is necessary to read the capacity of the tanks at certain intervals and thus keep check on the lines. When in use upon such a device, a double meter would necessarily have to be used, one meter being provided to record the drop and the other meter to record the filling up of the tank.

By providing a registering device in connection with a gasoline vending machine of the above mentioned character, considerable loss heretofore experienced will be saved and a person may accurately ascertain the exact amount of gasoline which is dispensed from the main measuring vessel in a simple and efficient manner. The parts being so arranged as not to interfere with the filling or dispensing operation of the machine or pump and the device is at all times maintained in an operative position. By further providing an electrically controlled meter actuating means the meter may be placed in any suitable manner at points away from the gasoline pump such as by placing the meter in an office, thus permitting the accurate reading of the meter to indicate the amount of gasoline which is sold or dispensed.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

In a liquid registering apparatus of the class described, a trigger arm adapted to be supported vertically and centrally in a liquid measuring vessel, a plurality of triggers pivotally supported intermediate their ends on said trigger arm and arranged at predetermined vertically spaced positions on said arm, spring means for normally holding the triggers in an inoperative position, a relatively movable push rod adapted to extend vertically in the vessel on one side of said trigger arm, a plurality of vertically spaced collars carried by said rod and arranged in predetermined vertically spaced positions and disposed substantially opposite one of the ends of the triggers, a guide rod adapted to extend vertically in said vessel on the opposite side of the trigger arm, and means movable vertically to operate the triggers in succession.

In testimony whereof I affix my signature.

FREDERICK L. HEATHMAN